United States Patent [19]
Alain

[11] Patent Number: 5,645,357
[45] Date of Patent: Jul. 8, 1997

[54] BI-DIRECTIONAL LUBRICATING BUSHING

[76] Inventor: George Alain, #2 4035 Ogden Road S.E., Calgary, Alberta, Canada, T2G 4N9

[21] Appl. No.: 659,147

[22] Filed: Jun. 5, 1996

[51] Int. Cl.⁶ .................................................. F16C 33/10
[52] U.S. Cl. ........................ 384/397; 384/322; 384/291
[58] Field of Search ................................. 384/322, 368, 384/397, 398, 399, 400, 291, 286

[56] References Cited

U.S. PATENT DOCUMENTS

| | | | |
|---|---|---|---|
| 2,474,980 | 7/1949 | Karl | 384/397 |
| 3,544,179 | 12/1970 | De Leu | 384/368 |
| 4,090,748 | 5/1978 | Sugimoto et al. | 384/291 |
| 4,189,985 | 2/1980 | Harris | 92/153 |
| 4,218,933 | 8/1980 | Allen et al. | 74/422 |
| 4,453,837 | 6/1984 | Shimizu et al. | 384/368 X |
| 4,576,488 | 3/1986 | Steiner et al. | 384/291 |
| 4,655,615 | 4/1987 | Mori | 384/286 |
| 4,810,105 | 3/1989 | Arlott et al. | 384/97 |
| 4,890,939 | 1/1990 | Koschinat | 384/322 |

FOREIGN PATENT DOCUMENTS 970158  8/1958  Germany ................... 384/397

*Primary Examiner*—Thomas R. Hannon
*Attorney, Agent, or Firm*—Gene Scott-Patent Law & Venture Group

[57] ABSTRACT

A shaft bushing provides a internal circumferential or annular surface and an adjacent internal radial surface both of which receive lubricant directly from an aperture in the bushing, in such a manner that outfacing surfaces, radial surfaces and in-facing surfaces of elements which are either a part of the shaft itself, or are mounted on the shaft, receive lubricant directly from the aperture. The aperture is formed as a straight hole and directed at an angle through the bushing wall so that its interface with the interior surfaces of the bushing are elliptical. Lubricant is directed through this hole to the interior of the bushing and thence to surfaces in contact therewith. The placing of the hole at an angle allows the lubricant to move in a straight line with no turns which might contribute to clogging, and results in a smooth transfer of lubricant from the hole to the interior surfaces in two orthogonal planes.

5 Claims, 1 Drawing Sheet

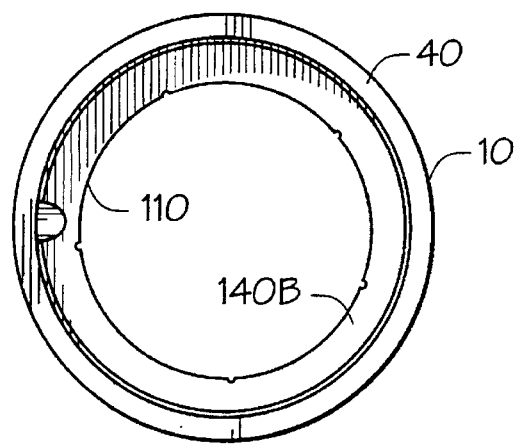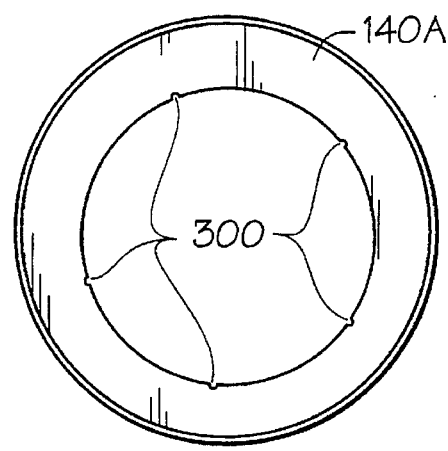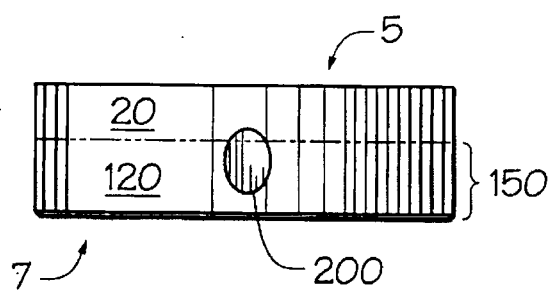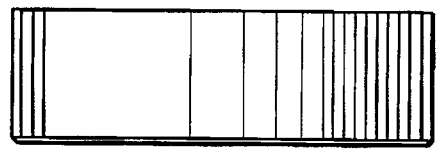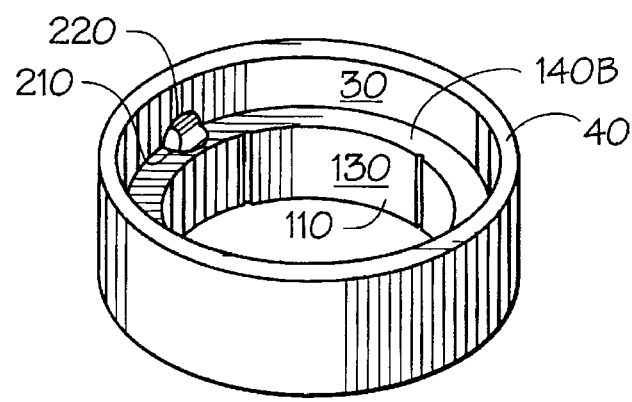

BI-DIRECTIONAL LUBRICATING BUSHING

BACKGROUND OF THE INVENTION

1. Field of the Invention

This invention relates generally to shaft bushings, and more particularly to an improved bushing providing a means for positioning a bearing and for providing improved lubricating to the bearing.

2. Description of Related Art

Invention and use of bushing devices is known to the public, as they are commonly used in mechanical assemblies where it is desired to support shafts and to provide improved lubrication thereto. Sugimoto et al U.S. Pat. No. 4,090,748 teaches a device for lubricating a rear bushing in an extension housing of an automotive transmission. Oil grooves which are formed in the bore of a hollow rear bushing are provided in such a pattern that upon rotation of the output shaft, lubricating oil is drawn into the grooves from both the front and rear ends of the bushing. The oil drawn in is distributed over the whole inner surface of the bore and discharged into the space behind the rear bushing. The extension housing is provided with a passageway which interconnects the space behind the rear bushing with the space ahead of it. Allen et al U.S. Pat. No. 4,218,933 teaches a rack and pinion bear assembly which includes a resilient bushing which urges the rack into mesh engagement with the pinion. An arcuate inside bearing surface of the busing has a larger radius of curvature than the curved outside surface of the rack against which it bears. The rack thus makes tangent contact with the bushing. When one portion of the bushing is worn so that excessive play appears in the steering gear assembly, the bushing may be removed from the housing of the assembly and rotated 180 degrees, reinserted into the housing to provide an upward bearing surface for slidably engaging the rack. Harris U.S. Pat. No. 4,189,985 defines a fabric-lined epoxy resin cylinder with lubricant retaining grooves. A woven seamless sleeve including axial yarns from the inner face of an epoxy resin cylinder for an air operated linear actuator. Under certain conditions, a minute internal, spiral groove develops in applying the resin. In the operation of the actuator the groove serves to retain lubricant. Steiner et al U.S. Pat. No. 4,576,488 shows a bearing busing for journal beating of a brake shaft of a drum brake. One end of the busing on the outside, is provided with a circumferential annular grease recess for the introduction of grease. Branching off in the axial direction from this recess are distributing channels, and disposed as extensions thereof on the opposite axial direction. In order to improve the distribution of grease, and to improve the formation of a closed lubrication film, each distribution channel opens out into a hole, which are interconnected on the inside by a circumferential, first annular channel. The inner lubricating channels are disposed between the distributing channels, extend parallel thereto between the holes and are connected to the first annular channel. The lubricating channels open out into a circumferential second annular channel, which is connected to a least one outlet channel. Mori U.S. Pat. No. 4,655,615 teaches a wrapped cylindrical bushing adapted to be force fitted into an axial opening of a bearing housing and is formed at its outer peripheral surface with one or more oil grooves. The oil groove or grooves are formed by press work such as embossing to extend obliquely relative to a parallel to the axis of the wrapped bushing such that they are in parallel with each other with respect to the line. Upon wrapping a metal strip into the bushing, the small grooves neither lessen the effect due to interference on the wrapped bushing nor produce any craze or crack at or near the oil grooves, thereby attaining out of roundness to a desired extent. Arlott et al U.S. Pat. No. 4,810,105 shows bearing sleeve provided which comprises another shell of a marine brass and an inner lining of nitrile rubber bonded to the inside surface of the shell. The lining extends axially beyond the end of the shell to form a portion positioned beyond the end of the shell and turned over the end of the shell. This portion comprises radial lands separated by radial grooves, and the radial lands define axial bearing surfaces for cooperation with an axial bearing surface of a bearing member which the bearing sleeve surrounds in use.

The prior art does not teach a bushing capable of direct, two-direction lubrication of a type that is inexpensive to manufacture and is essentially clog resistant. The present invention fulfills these needs and provides further related advantages as described in the following summary.

SUMMARY OF THE INVENTION

The present invention is an improved bushing for improved lubrication of a shaft, and is directed at applications where the shaft especially requires lubrication at the interface of two differing diameters of the shaft. The bushing is configured for fitting around and enclosing a shaft having two different diameters, or a shaft and a bearing race fitted to the shaft, or a shaft and its flange, or other such configurations. In such applications, it is generally known that it is difficult to provide lubrication to the shaft and to elements congruent with the shaft but which do not lay in a position wherein lubrication on the shaft proper can easily migrate to these elements, especially where portions include diameters which are larger then the shaft outer surface itself.

The present invention provides a bushing having both an internal circumferential or annular surface and an adjacent internal radial surface both of which receive lubricant directly from an aperture in the bushing, in such a manner that outfacing surfaces, radial surfaces and in-facing surfaces of elements which are either a part of the shaft itself, or are mounted on the shaft, receive lubricant directly from the aperture.

Thus, it is an object of the present invention to provide a bushing that is able to provide lubricant from an outside diameter surface to the interior of the bushing. It is a further object to provide an aperture for carrying lubricant from the outside surface of the bushing to a radial surface within the bushing and at the same time to an adjacent internal annular surface as well so as to provide lubrication to any surface which may lay in contact with these bushing surfaces. It is a further object of the present invention to provide a bushing as described that includes an aperture hole that is tilted with respect to the outer surface of the bushing so as to provide a straight, least length path from the outer surface of the bushing to the interior lubricating surfaces of the bushing. Such a direct path is most successful at remaining clog free. It is a further object to provide a plurality of longitudinal grooves on the inside diameter of the bushing, with the grooves in communication with one of the lubricating surfaces of the bushing so as to more directly provide lubricant to the outer surface of the shaft.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the preferred embodiment of the present invention, a bushing. In such drawings:

FIG. 1 is a front elevational view thereof;

FIG. 2 is a rear elevational view thereof;

FIG. 3 is a left side elevational view thereof, particularly showing an aperture of the invention;

FIG. 4 is a right side elevational view thereof; and

FIG. 5 is a perspective view thereof.

DETAILED DESCRIPTION OF THE PREFERRED EMBODIMENT

The above described drawing figures illustrate a bushing for mounting upon a shaft. The bushing is particularly adapted for lubricating a shaft and its elements. The bushing includes a cylindrical outer wall 10 defined by an outer wall outer annular surface 20 and concentric thereto, an outer wall inner annular surface 30. The outer and inner annular surfaces 20, 30 of the outer wall 10 are joined on one side 5 of the bushing by a outer wall side surface 40.

A cylindrical inner wall 110 is defined by an inner wall outer annular surface 120 and an inner wall inner annular surface 130. The outer and inner annular surfaces 120, 130 of the inner wall 110 are joined on the other side 7 of the bushing by an inner wall outer side surface 140A. The outer side surface 140A is opposed by an inner side surface 140B, the side surfaces defining the width 150 of the inner wall 110.

The inner and outer walls 110 and 10 respectively form a single integral part in that the outer annular surfaces 20 and 120 make up a common annular exterior surface of the bushing and the inner annular surface 30 of the outer wall 10 abuts the inner side surface 140B of the inner wall 110. The bushing is preferably formed from a single block of metal, but it might be fabricated otherwise as well.

The outer and inner walls 10, 110 define an aperture 200 which passes through them. The aperture 200 extends from the outer annular surfaces 20 and 120, through the bearing such that a first portion 210 of the aperture 200 terminates on the inner side surface 140B, while a second portion 220 of the aperture 200 terminates on the inner annular surface 30. Therefore, the aperture 200 simultaneously interfaces with both a circumferential surface (30) as well as a radial surface (140B) within the interior of the bushing. The discovery of this approach is considered to be the key to the remarkable results that this bearing achieves in operation.

In the preferred embodiment, the aperture 200 is a round hole positioned at an angle, preferably 45 degrees, relative to the outer annular surfaces 20, 120 so that the shape of the termination of the aperture 200 at both the inner annular surface 30, and the side surface 140B are a pair of smooth curves preferably ellipses, as shown in FIG. 5. The angle of the aperture 200, and the fact that it is preferably a smooth and straight hole provides greatly improved lubrication characteristics to the present bushing. Depending upon operating characteristics of the shaft assembly in which the bushing of the present invention is used, weather, temperature and other ambient variables, and the viscosity and other variables of the lubricant, the aperture may be selected to be of a larger or a smaller diameter. Importantly, the angle of the aperture, and its position dictates how much lubricant is delivered to the annular, as opposed to the radial interior surfaces of both the bushing as well as any surfaces which are in contact with the bushing. It has been discovered and invented, that an aperture may be placed at an angle within the wall of a bushing to provide lubricant to two mutually orthogonal surfaces (30 and 140B) within the bushing, and that the angle and position of the aperture may be selected to cause the aperture to be intersected by the intersection of the inner annular surface 30 of the outer wall 10, and the side surface 140B of the inner wall 110. It has been further discovered that by changing the angle of the aperture 200, it is possible to establish the ratio of the amounts of lubricant to be delivered to the two mutually orthogonal interior surfaces of the bushing (30 and 140A) and the shaft components which abut the bushing.

The bushing preferably further includes a plurality of longitudinally oriented, spaced apart grooves 300 on the inner annular surface 130 of the inner wall 110. These grooves 300 preferably extend across the inner annular surface 130.

In use the inner annular surface 130 is forced into contact with a shaft (not shown) upon which the bushing is mounted. A portion of a bearing race (not shown) is preferably pushed inside of the bushing outer wall 10, so that the outer wall 10 is at least partially covering the bearing race. The bearing race is preferably in contact with the inner wall side surface 140B. Now because of the orientation and position of the aperture 200, lubricant is able to easily move to the outside surface of the bearing race along the inner of the annular outer wall surfaces 30, and also, to the side of the bearing race along the inner wall side surface 140B. The latter surface also is able to feed lubricant to the grooves 300 for lubrication of the shaft. Alternately, the bushing of the present invention is able fit over an enlarged portion of the shaft (not shown) where the enlarged portion has a diameter larger than the shaft generally. This enlarged portion, or shoulder, or flange, is frequently a part of the general construction characteristic of operating shafts. In these situations, the present invention operates in the same manner as described for the beating race, providing improved lubricant flow to all parts of the shaft and its accouterments.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A bushing for mounting upon a shaft, the bushing comprising:

a cylindrical outer wall including an outer wall outer annular surface and an outer wall inner annular surface, the outer and inner annular surfaces of the outer wall joined by a outer wall side surface on one side of the bushing;

a cylindrical inner wall including an inner wall outer annular surface and an inner wall inner annular surface, the outer and inner annular surfaces of the inner wall joined by an inner wall outer side surface on the other side of the bushing, the inner wall providing an inner side surface in opposition to the outer side surface;

the outer annular surface of the inner wall and the outer annular surface of the inner wall being consonant so as to make a single continuous composite surface so that the outer and inner cylindrical walls are joined as a single integral part;

the outer and inner walls defining an aperture therein, the aperture extending from the outer annular surface of the outer wall, through the outer wall, a first portion of the aperture terminating at the inner annular surface of the outer wall, and a second portion of the aperture terminating at the inner side surface of the inner wall.

2. The bushing of claim 1 wherein the aperture is a round hole positioned at an angle relative to the outer annular surface of the outer wall so that the shape of the termination of the aperture at both the inner annular surface of the outer wall, and the inner side surface of the inner wall, are a pair of smooth curves.

3. The bushing of claim 2 wherein the angle is 45 degrees so that the pair of smooth curves are portions of an ellipse.

4. The bushing of claim 2 wherein the hole is bisected by the intersection of the inner annular surface of the outer wall, and the inner side surfaces of the inner wall.

5. The bushing of claim 1 further including a plurality of longitudinally oriented, spaced apart grooves on the inner annular surface of the inner wall.

\* \* \* \* \*